R. LOEB.
EMBROIDERING MACHINE.
APPLICATION FILED SEPT. 25, 1900.

904,626.

Patented Nov. 24, 1908.

Witnesses:

Inventor:
Rudolf Loeb
by his Attorneys,

R. LOEB.
EMBROIDERING MACHINE.
APPLICATION FILED SEPT. 25, 1900.

904,626.

Patented Nov. 24, 1908.
5 SHEETS—SHEET 5.

Witnesses:
Frank H. Graham
Murray C. Boyer

Inventor:
Rudolf Loeb
by his Attorneys.

UNITED STATES PATENT OFFICE.

RUDOLF LOEB, OF CAMDEN, NEW JERSEY.

EMBROIDERING-MACHINE.

No. 904,626.  Specification of Letters Patent.  Patented Nov. 24, 1908.

Application filed September 25, 1900. Serial No. 31,061.

*To all whom it may concern:*

Be it known that I, RUDOLF LOEB, a citizen of the United States, and a resident of Camden, New Jersey, have invented certain Improvements in Embroidering-Machines, of which the following is a specification.

My invention consists of certain improvements in that class of embroidering machines known as round stitch machines, or embroidering machines of the Cornely type; the object of my invention being to provide special mechanism for rotating the needle and its spindle and the nipple; to provide a channel through the sleeve of the needle spindle and nipple guide for the passage of the embroidering thread to the point where it is sewn to the fabric; to facilitate the delivery of the thread to this channel; to provide for a firmer mounting for the pantograph lever in order that the movement of its foot may be true and steady; to give an intermittent feed to the embroidering thread whereby it may be readily sewn down to form the predetermined design, and to insure the proper tension for said thread so that the work will not appear drawn or uneven.

A further feature of my invention consists in maintaining a constant supply of embroidering thread at hand, ready for continuous use.

Other features of my invention, shown in the accompanying drawings, will be more clearly pointed out hereinafter, reference being had to said drawings, in which:

As I have stated, the improvements forming the subject of my invention have been applied to a round stitch embroidering machine of the Cornely type, hence it is to be understood that no change has been made in the driving mechanism of the same, except in the mechanism carried by the thread spindle for rotating the same continuously. The transmitting mechanism for operating said thread spindle, the needle spindle and the nipple spindle, being the same as that used heretofore, as is also the mechanism for operating the pantograph lever.

1 is the nipple spindle, controlled, so far as rotative movement is concerned, which movement is intermittent by the pantograph lever, and only rotated when the pantograph handle is moved.

2 is the thread spindle, driven, by means of the gear wheels 3 and $3^a$ and the intermediate wheel 4, in one direction continuously. In order to give the nipple spindle 1 the desired intermittent rotating movement through the operation of the pantograph handle, the following mechanism is employed: The gear wheel 3 is provided with a hub 5 on which is mounted the gear wheel 6, said gear wheel having two sets of teeth, $6^a$ and $6^b$. Engaging the teeth $6^a$, is the gear wheel 7 carried by a suitable shaft 8, and driven by means of the bevel gears $8^a$ and $8^b$, from the pantograph handle through the usual transmitting mechanism.

Engaging the teeth $6^b$ of the gear wheel 6 is a pinion 9 carried by a frame 10 which is rotated with the thread spindle 2 independently of the nipple spindle 1. The pinion 9 is disposed eccentrically to the frame 10. At the upper end of the stud 11 carrying this pinion 9, is another pinion $9^a$ engaging a gear wheel 12 splined to the nipple spindle 1; such arrangement being a form of the well known planet gearing. By this means, the nipple spindle 1 will be given an intermittent movement independent of the regular continuous rotary movement of the frame 10 and thread spindle 2, which moves around the spindle 1 and carries the channel or conduit for the passage of the embroidering thread $x$ to the nipple where it is sewn to the fabric.

The embroidering thread is introduced into the channel or passage 13 in the upper portion of the needle spindle extension 14, passes down through said channel and out through the slot 15 in the nipple spindle extension 16 and is directed to the channel or conduit 17 carried by the frame 10. The thread then passes to the channel 18 in the thread spindle 2 surrounding the nipple spindle 1; emerges from said channel at 19 and is then directed over one or more of the usual fingers 20, which serve to give a certain amount of tension to the thread, to the pantograph foot 21 which guides it around the nipple 22 to form the design, which design is sewn in the usual manner by the needle 23 with the thread from the usual looper located beneath the bed plate of the machine.

Figures 2, 3, 4, 5, 6, 7:
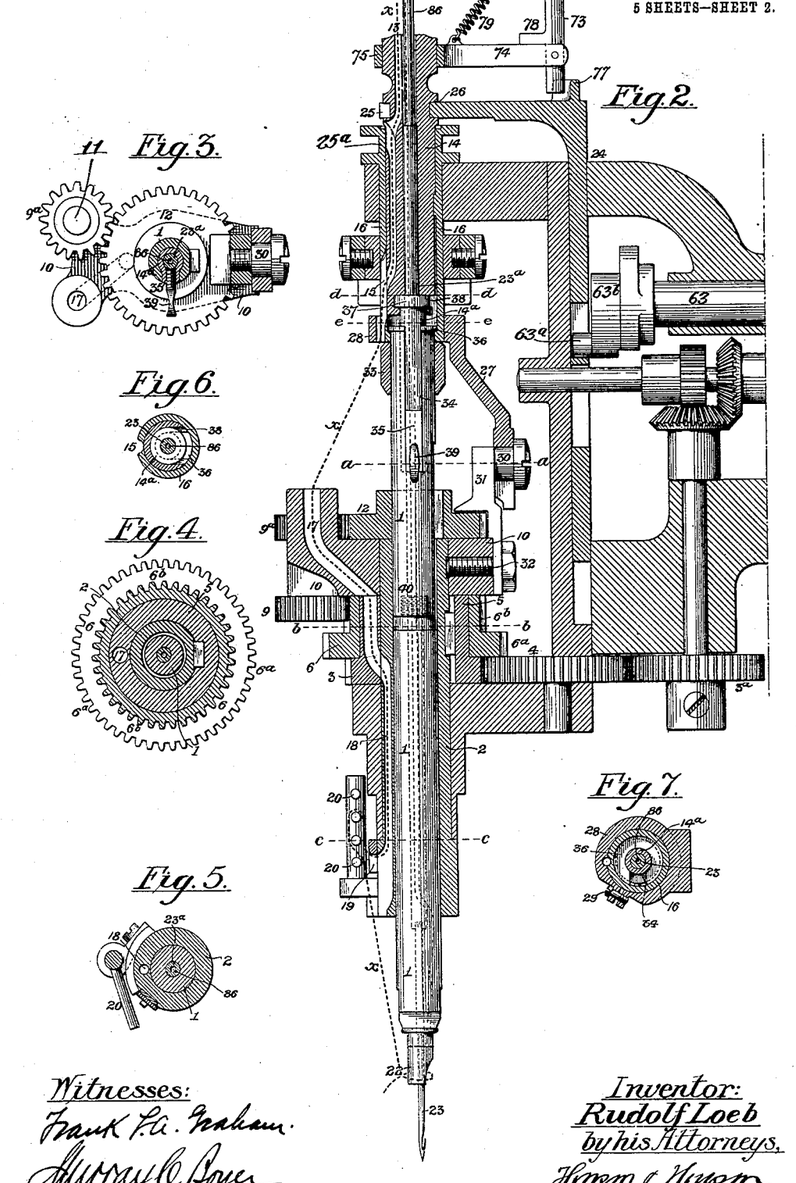
Fig. 2, is a vertical sectional view of the head of the machine, the nipple spindle being shown in full lines.
Figs. 3, 4, 5, 6 and 7, are sectional plan views on the lines $a$—$a$; $b$—$b$; $c$—$c$; $d$—$d$ and $e$—$e$, respectively, Fig. 2.

The needle spindle extension 14 is arranged to be moved up and down in the manner usual to this class of machines, but I prefer to arrange the vertically movable member 24 providing such movement above the head of the machine, so that the fork 25 of the same will engage the recessed portion 26 of the needle spindle extension. The nipple spindle extension 16 surrounds the needle spindle extension 14, and a rotative movement is imparted to this nipple spindle extension by means of the forked arm 27 having a collar 28 by means of which it is secured to the nipple spindle extension. This collar is preferably split as shown in Fig. 7, and clamped to the nipple spindle extension by means of a screw 29. The lower forked end of the arm 27 is engaged by a pin 30 carried by an arm 31 secured to the frame 10 by the screw bolt 32. By this connection, provision is made for the simultaneous rotation of the nipple spindle extension and the needle spindle extension, and for the vertical movement of the nipple spindle extension.

The upward movement of the needle bar 23$^a$ and its spindle 14$^a$ is accomplished by the engagement of a pin 63$^a$ carried by a cam 63$^b$ on the shaft 63, with the movable member 24, and this movement takes place in advance of similar movement imparted to the nipple spindle by an arm 24$^a$ engaging a collar 25$^a$ of the nipple spindle extension, but the downward movement of these parts is in the reverse order. The arm 24$^a$ is carried by a slidable member 24$^b$, and a spring 24$^c$ is provided for returning said slidable member to its lowermost position. To raise this member 24$^b$ and thereby effect the upward movement of the nipple spindle, I provide a bell-crank lever pivoted at 24$^d$; one arm 24$^e$ of said lever lying in the path of the cam 63$^b$, while the other arm 24$^f$ has a pin 24$^g$ for engagement with a pin 24$^h$ carried by said slidable member 24$^b$. To limit the downward movement of the nipple spindle extension, I mount a collar 33 on the nipple spindle 1, as clearly shown in Figs. 1, 2, 8 and 11.

The upper end of the nipple spindle 1 is slotted at 34, as clearly shown in Fig. 2, and adapted to this slot is a projection 35 carried by the needle spindle 14$^a$, whereby said needle spindle may be rotated by said nipple spindle; these parts being controlled, of course, by the pantograph mechanism.

At the extreme upper end of the nipple spindle, a shoulder or collar 36 is provided, by means of which it is retained in the nipple spindle extension 16, said nipple spindle being introduced into the machine from the top. The needle spindle is also provided with a collar or shoulder 37 by means of which it is held to the needle spindle extension 14 and can move with the same; said collar can be slipped into a slotted yoke 38 at the bottom of said extension. The needle spindle 14$^a$ and needle-bar 23$^a$ are held in engagement with each other by means of the thumb screw 39, which passes through the projection 35 and contacts with said needle-bar. I prefer to make the nipple spindle in two parts, as shown in Fig. 2, and these parts are connected together by threading one into the other, as seen at 40.

Figure 8:
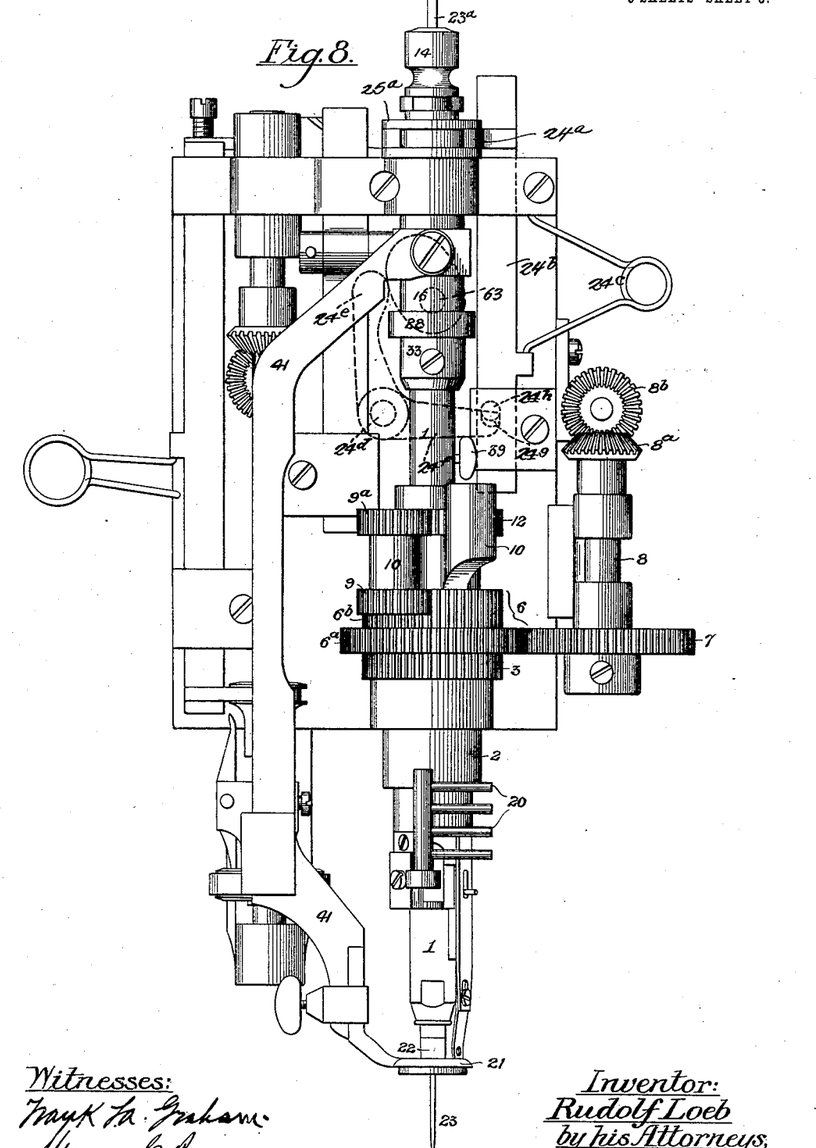
Fig. 8, is an end elevation of the head of the machine shown in Fig. 1, said view being on an enlarged scale.
Figure 9:
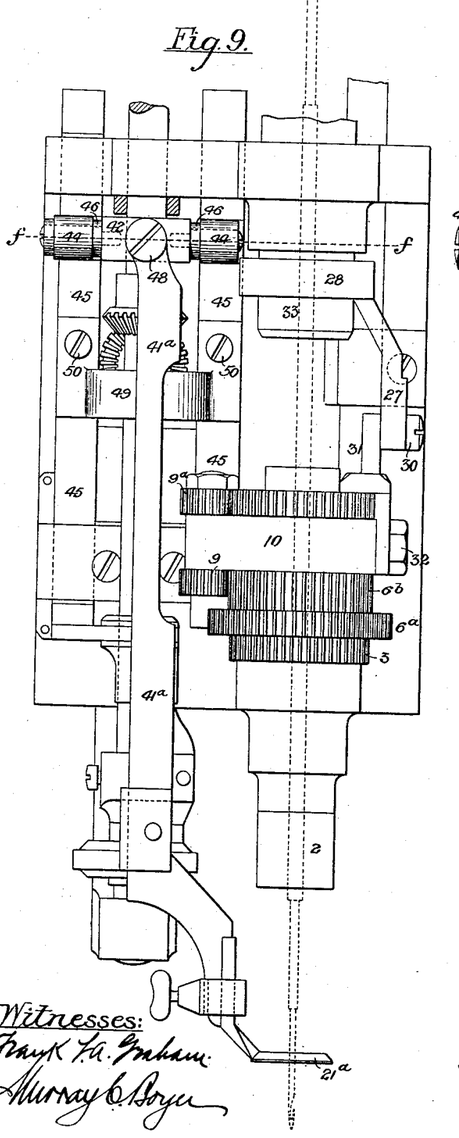
Fig. 9, is an end view of an embroidering machine of this general character, showing a modified form of pantograph lever.
Figure 10:
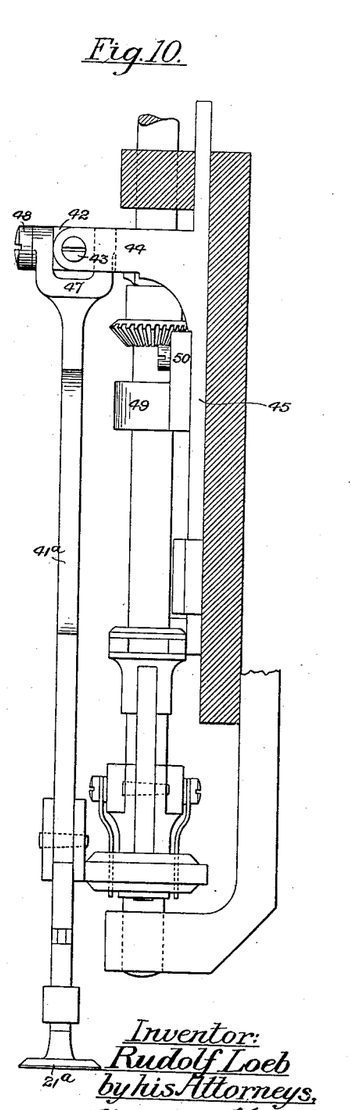
Fig. 10, is a side elevation of the head shown in Fig. 9, partly in section, showing a side view of the pantograph lever.
Figures 11, 12, 13:
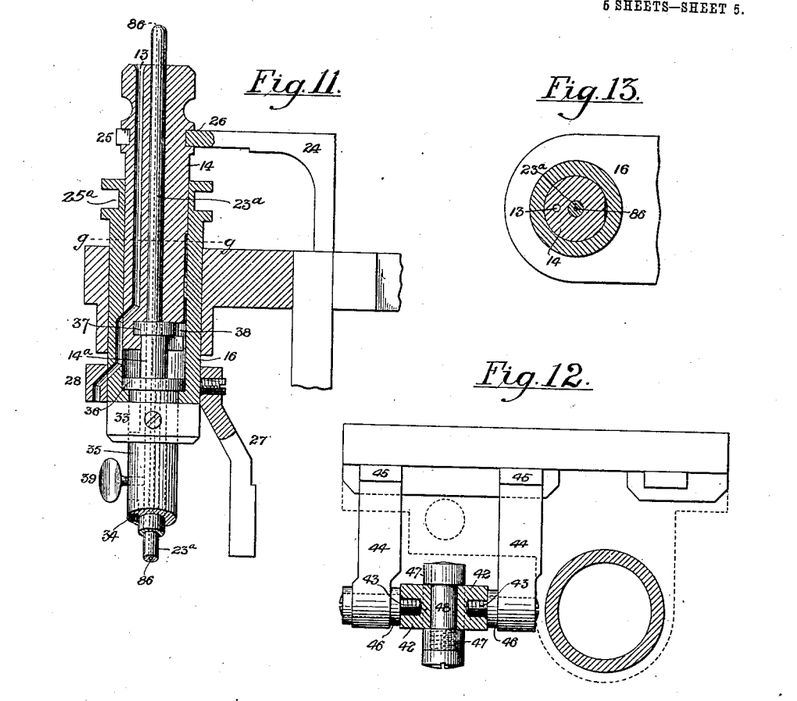
Fig. 11, is a sectional view showing a modified form of the upper portion of the head of the machine shown in Fig. 1.
Fig. 12, is a sectional view on the line $f$—$f$, Fig. 9, showing the support for the modified form of pantograph lever.
Fig. 13, is a sectional view on the line $g$—$g$, Fig. 11, showing a detail of construction.

With the form of driving and operating mechanism for the nipple spindle, just described, the ordinary form of pantograph lever is employed, such for instance as shown in Fig. 8. This form of lever, however, would interfere with the improved mechanism surrounding the nipple spindle. Moreover, the supporting bearing for this style of pantograph lever is objectionable, as it must be kept loose owing to the peculiar movement of the pantograph lever. With the form of pantograph lever shown at 41 in Fig. 8, the loose bearing is necessary as the foot 21 of the pantograph is continuously changing its movement. This movement is always in the nature of a step-by-step motion, but its direction varies according to the design of embroidery to be followed. This pantograph foot moves the fabric in order to effect the proper disposition of the embroidering thread sewn in the same. To obviate the loose mounting of the pantograph lever, I have devised the improved form of support shown in Figs. 9, 10 and 12. In these views 41$^a$ represents the pantograph lever which is hung to one side of the nipple spindle extension 16. Theoretically this mounting is wrong, for the reason that when the foot 21$^a$ of said lever is making its step-by-step movement as the lever is operated, the under surface of said foot is constantly changing from the horizontal. In practice, however, the movement of the foot is in such a limited area that this change of plane is not material. The lever 41$^a$ is hung from a block 42 supported by the journal or pivot pins 43 which are carried by arms 44 mounted on the slides 45. Collars 46 are interposed between the block 42 and the arms 44 so that said support will be solid at all times. The block 42 swings on the pins 43, this arrangement providing for movement of the pantograph lever in one direction. To provide for the movement of said lever in the opposite direction, the upper end of the same is forked at 47, and this forked portion is secured to the block 42 by means of the screw pin 48. This method of hanging the pantograph lever gives it a substantially universal joint or connection. The slides 45 are connected together by the cross-piece 49, held in place by suitable screws 50.

In all embroidering machines of the class to which my improvements have been applied, no provision has been made for a constant supply of the embroidering thread. This thread is usually bulky, and the embroidering machines hitherto constructed have only been arranged to carry small spools of the same, which must be constantly renewed. This constant renewal is a source of much delay in effecting the embroidering desired, so much so, that in ordinary embroidering machines the means for supplying thread to the nipple is such that a new spool must be added about every five minutes. This it may be readily understood, is both expensive and annoying, as the thread has to be placed in the passage in the nipple spindle extension and conveyed through the various channels in the head of the machine to the sewing needle, each time a new spool is set in place. Moreover, the most important point lies in the fact that each time a spool runs out and a new thread is started on the fabric, a defect is made in the embroidery which must be remedied by hand sewing, and at the same time, the end of each new thread must be tacked down. With an embroidering machine of this character, constructed as I have arranged it, however, a supply of thread may be carried by the same and continuously fed to the sewing needle, such supply lasting an entire day, so that the machine need be threaded but once a day. In using the small spools of embroidering thread moreover, the tension changes just as soon as the thread begins to run off the spool, so that the first part of the embroidery will be loose, while the last part will be tight. When the thread is delivered in the manner devised by me, the tension is constant, the thread being sewn down uniformly. I also provide means for feeding the embroidering thread readily to the sewing thread so that there will be no tendency of the embroidery to show a drawn or pulled appearance.

Figure 1:
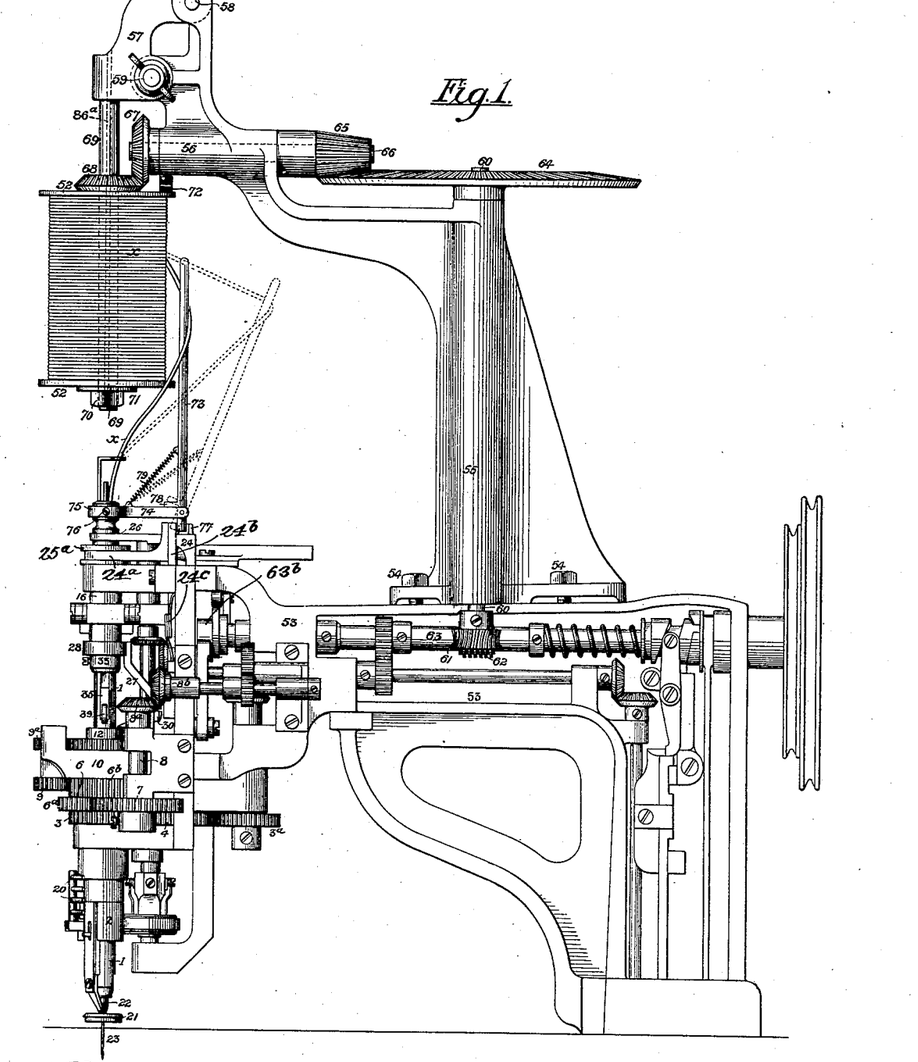
Figure 1, is a view in elevation of a machine embodying my invention, showing the operating mechanism exposed.
Figure 14:
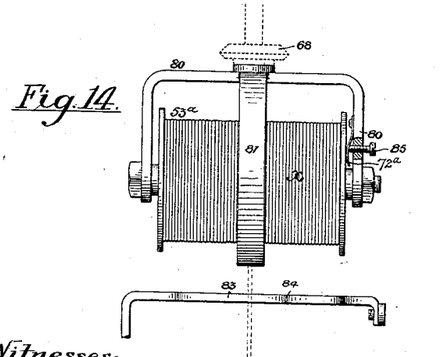
Fig. 14, is a view of a modification of the thread carrying structure.
Figure 15:
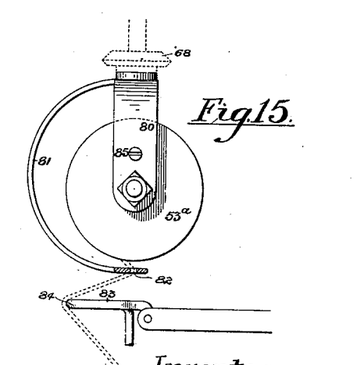
Fig. 15, is an end view of the structure shown in Fig. 14.

In Fig. 1, I have shown special means for delivering the embroidering thread to the channel or passage 13 in the needle spindle extension, and in Figs. 14 and 15, I have shown another device for effecting the same result. In Fig. 1, a spool 52 of embroidering thread is suspended directly over the nipple spindle 1 of the machine, so that the center of the axis of the spool is the same as the center of the vertical axis of the needle bar.

The thread spool 52 is supported and rotated in the following manner: Mounted on the arm 53 of the machine and secured thereto by means of bolts 54, is a standard 55, projecting some distance above said arm 53. This standard has an arm 56 projecting at right angles from the same, and the thread spool is carried by a bracket 57, hinged at 58 to said arm 56, and having a thumb screw 59 whereby it may be retained in its proper position with relation to the needle bar of the machine. The standard 55 has a shaft 60 extending through the same, and this shaft carries at its lower end a worm wheel 61 which receives its motion from a worm 62 carried by the main driving shaft 63. At the upper end of the shaft 60, a bevel gear wheel 64 is mounted. This bevel wheel meshes with a bevel pinion 65 carried by a short shaft 66 located within the arm 56, and at the opposite end of this short shaft a bevel wheel 67 is carried, meshing with a similar bevel wheel 68 carried by the thread spool spindle 69, whereby said spool is driven. The spool is supported in place by the nut 70 having a plate 71, said nut being adapted to the end of the spindle 69.

The spool 52 is loosely mounted on the spindle 69 and receives its movement by frictional contact therewith. For the purpose of retarding this movement, should it be desirable at any time, I provide a spring finger 72 carried by the arm 56 and adapted to engage the upper flange of the spool. This spring finger will also serve to stop the rotation of the spool when the movement of the spindle ceases. Provision may be made for increasing or diminishing the pressure of said spring. If desired, however, the connection between said spool and its spindle may be made positive, and the gearing so timed that the thread will be delivered as required.

To renew the spool after the thread from one has been used, the thumb screw 59 is released, permitting the swinging of the bracket 57 from its hinge at 58. The nut 70 is then unscrewed, when the empty spool may be removed from the spindle 69, and a full spool put in place. The nut is then secured to the end of the spindle, and the bracket returned to its normal position and held by the set screw 59.

A thread guide comprising a vertical stem 73 is carried by the upper end of the needle spindle extension 14, and this stem is so arranged that it may be moved during the rotation of the needle spindle extension for the purpose of giving the embroidering thread an extra pull during every revolution of the nipple in order that the thread may be fed to said nipple and the sewing needle in proper shape. The stem 73 is pivotally mounted on the end of an arm 74 which projects from a ring 75 mounted on the upper portion of the needle spindle extension 14, and secured thereto by a screw 76. The stem 73 is movable in one direction only, and has a portion projecting below the arm 74, so that such movement may be effected by the engagement of said projecting portion with a cam 77 carried by the vertically moving member 24. A foot 78 is carried by the stem 73 for the purpose of preventing any inward movement of said stem, and a spring 79 is employed to maintain said stem in the vertical position.

In Figs. 14 and 15, I have shown another form of spool support, in which a yoke 80, adapted to be carried by the bracket 57, serves as a support for a spool 53ª. For the purpose of guiding the thread, I secure to this yoke a curved arm 81, having an eye 82 for the passage of the thread, disposed directly above the needle bar of the machine. As the thread leaves this spool, it contacts with a curved arm 83 secured to the head of the machine, and arranged to project into the path of the embroidering thread as it is delivered from said spool. The curved portion 84 of this arm is so arranged that as the spool yoke is revolved and the thread delivered by the same contacts with said curved arm, an extra pull will be given the same, as the fabric at this point in the operation of the machine, is being held, either by the foot of the pantograph lever or by the nipple. By this means, the movement of the spool yoke being timed, a sufficient quantity of embroidering thread to supply the sewing needle and thereby effect the necessary embroidery, is pulled forward by the curved arm at every revolution of the spool yoke. In this form of thread carrying device, the thread is pulled from the spool as it is used, the spool rotating by such action. To prevent too rapid rotation of the spool, I provide a spring finger 72ª in engagement with the flange of said spool, and for the purpose of adjusting the tension of this spring, I arrange the set screw 85.

The shaft 60 carried by the standard 55 is provided with a worm wheel 61 which derives its motion from a worm 62 carried by the main driving shaft 63. This form of driving mechanism for the shaft 60 is preferred, as the stopping of the main driving shaft will act to stop the counter shaft 66 as soon as said driving shaft comes to rest; the teeth of the worm wheel 61 jamming in the worm 62.

With this class of embroidering machines, it is often desirable to make that style of embroidery known as underlining, such for instance as shown in Fig. VII, of the patent to E. & R. Cornely, No. 466,889, patented January 12, 1892. For this purpose an extra thread must be delivered to the sewing needle in such position that the embroidering thread guided by the nipple may be wrapped around the same, the whole being sewn in the usual manner. For the purpose of introducing such additional thread, the needle bar 14ª is provided with a passage 86 as shown in Figs. 2, 3, 4, 5, 6 and 7. As this additional thread must be directed so that it will not become entangled with the embroidering thread, the spindle 69 of the spool 53 may also be provided with an opening 86ª extending through the same, for the passage of said additional thread.

While I have shown the improvements forming the subject of my invention as applied to a round stitch machine of the Cornely type, it will be understood that with but slight modification, such improvements may be applied to all forms of embroidering machines.

Having thus described my invention, I claim and desire to secure by Letters Patent:

1. The combination in an embroidering machine, of a nipple spindle mounted in the head of the machine, a nipple carried thereby, a needle spindle operatively connected to the nipple spindle, means for operating said spindles, a rotatable frame carrying a portion of the means for transmitting movement to the spindles, said frame having a channel for the passage of the embroidering thread whereby said thread may be delivered uniformly during the rotation of the frame, and means for driving said frame.

2. The combination in an embroidering machine, of the nipple spindle mounted in the head of the machine, a nipple carried thereby, a needle spindle operatively connected to the nipple spindle, means for operating said spindles, a rotatable frame, said frame carrying a portion of the means for transmitting movement to the spindles and having a channel for the passage of the embroidering thread whereby said thread may be delivered in one position with relation to the needle during the rotation of the frame, and means for driving said frame.

3. The combination in an embroidering machine, of a nipple spindle mounted in the head of the machine, a nipple carried thereby, a needle bar within the nipple spindle and carrying a needle which is projected through the nipple, a spindle for carrying the needle bar, means for operating the nipple and needle spindles simultaneously, a rotatable frame having movement independent of the spindles and carrying a portion of the means for transmitting movement to the spindles, said frame having a channel for the passage of the embroidering thread whereby said thread may be delivered to the nipple to be sewn by the needle at a uniform position with relation to the latter during the rotation of the frame, and means for driving said frame.

4. The combination in an embroidering machine, of a nipple spindle mounted in the head of the machine, a nipple carried thereby, a needle spindle, a needle bar, a needle carried thereby, means for operating the nipple and needle spindles simultaneously, a frame surrounding said nipple spindle, and means for driving said frame independently of the nipple spindle, said frame carrying a portion of the means for transmitting movement to the spindles and having a channel for the passage of the embroidering thread whereby said thread may be delivered to the nipple to be sewn by the needle uniformly at one point with respect to the latter during the rotation of said frame.

5. The combination in an embroidering machine, of a nipple spindle mounted in the head of the machine, a nipple carried thereby, a needle bar arranged within said nipple spindle and having a needle which projects through the nipple, means for imparting intermittent rotative movement simultaneously to said nipple spindle and needle bar, a frame surrounding said nipple spindle and carrying part of the means for transmitting movement to the spindle, said frame having a channel for the passage of the embroidering thread whereby said thread may be delivered to the nipple to be sewn by the needle uniformly at one point with respect to the latter during the rotation of said frame, means for driving said frame, and means for giving vertical movement to the nipple and needle bar independently of each other.

6. The combination in an embroidering machine, of a nipple spindle, a nipple carried thereby, a needle spindle and needle rotatable with the nipple spindle, means for rotating said nipple spindle through the medium of pantograph mechanism, a frame surrounding said nipple spindle and carrying means for transmitting the movement of the pantograph to the nipple spindle, independent means for continuously rotating the frame, and a thread spindle carried by said frame, the latter having a channel for the passage of the embroidering thread whereby said thread may be delivered uniformly at one point with relation to the needle.

7. The combination in a round stitch embroidering machine, of the nipple spindle, a gear wheel carried by the same whereby movement may be imparted thereto, a rotatable frame surrounding said nipple spindle, a double gear wheel carried by said frame, said double gear wheel being driven by the pantograph mechanism, and means carried by the rotatable frame for transmitting the movement of the double gear wheel to the gear wheel carried by the nipple spindle, substantially as described.

8. The combination in a round stitch embroidering machine, of the nipple spindle, a gear wheel carried by the same, a rotatable frame surrounding said nipple spindle, a double gear wheel carried by said frame, said gear wheel being driven by the pantograph mechanism, and pinions carried by the rotatable frame and engaging one set of teeth of the double gear wheel and the gear wheel of the nipple spindle respectively, whereby movement may be imparted to the nipple spindle, substantially as described.

9. The combination in a round stitch embroidering machine, of the head, a thread guiding spindle suitably journaled therein, a frame connected to and removable with said thread spindle, means for moving said frame, a nipple spindle passing through said thread spindle, and independently rotatable with respect thereto, a gear wheel carried by said nipple spindle, pantograph mechanism, and means for operating said nipple spindle from the pantograph mechanism through the medium of pinions carried by the movable frame or block, one of which is in engagement with the gear wheel carried by the nipple spindle.

10. The combination in an embroidering machine, of the head, a thread guiding spindle mounted therein, means for rotating said spindle, a frame or block carried thereby and rotatable therewith, means for rotating the same, a thread spindle extension mounted in the upper portion of the head of the machine, and a sliding connection between the rotating frame carried by the thread spindle and the extension whereby the latter will be rotated with said thread spindle, substantially as described.

11. The combination in an embroidering machine, of the frame, a thread guiding spindle mounted therein, means for rotating the same, a frame or block carried by said spindle, a thread spindle extension mounted in the upper portion of the frame of the machine, a connection between the rotating frame carried by the thread spindle and the extension, whereby the latter will be rotated with said thread spindle, and means for raising the thread spindle extension, substantially as described.

12. The combination in an embroidering machine, of the frame, a thread guiding spindle mounted therein, means for rotating the same, a frame or block carried by said spindle, a thread spindle extension mounted in the upper portion of the frame of the machine, a forked arm clamped to said extension and a pin carried by the frame or block and adapted to be engaged by said forked arm whereby the extension may be rotated by the thread spindle, substantially as described.

13. The combination in an embroidering machine, of the head, a thread guiding spindle mounted therein, a nipple spindle, a needle spindle carried by said nipple spindle, a needle spindle extension, a needle bar within the needle spindle extension and coupled to the needle spindle, means for raising the neeedle spindle and its extension, and means for rotating the same, said means including a coupling for the needle spindle and the nipple spindle which provides for the simultaneous rotation of these parts, but permits vertical movement independently of each other.

14. The combination in an embroidering machine, of the frame, a thread guiding spindle mounted in the head of the same, means for rotating said spindle, a nipple spindle mounted within the thread spindle and independently rotatable, a nipple spindle extension rotatable with the nipple spindle, a needle spindle, a needle spindle extension carrying a needle bar, said nipple spindle extension having a slotted portion for engagement with a projecting part of the needle spindle whereby said needle spindle and its extension may be rotated from the nipple spindle but moved vertically independently thereof, and means for operating said nipple spindle.

15. The combination in an embroidering machine, of the nipple spindle, a nipple spindle extension, a channel for the passage of the embroidering thread carried by said extension, and means for giving the thread a pull at regular intervals in its passage to said channel.

16. The combination in an embroidering machine, of the nipple spindle, means for rotating the same, a nipple spindle extension rotated simultaneously with the nipple spindle, and a movable thread guide carried by said extension for the purpose of giving the thread an intermittent pull as it passes to the channel in said extension.

17. The combination in an embroidering machine, of the nipple spindle, means for rotating the same, a nipple spindle extension rotated simultaneously with the nipple spindle, a movable thread guide carried by said extension for the purpose of giving the thread an intermittent pull as it passes to the channel in said extension, and means for moving said thread guide, substantially as described.

18. The combination in an embroidering machine, of the nipple spindle, means for rotating the same, a nipple spindle extension rotated simultaneously with the nipple spindle, a movable thread guide carried by said extension, means for raising the nipple spindle extension, and a cam carried by said means and acting on the thread guide whereby the latter is caused to pull the thread intermittently as it passes to the channel in the nipple spindle extension, substantially as described.

19. The combination in an embroidering machine, of the nipple spindle, the nipple spindle extension, a pantograph lever arranged at one side of the nipple spindle extension, slides carried by the head of the machine and operatively connected to said nipple spindle extension, a block pivotally mounted in said slides, a yoke carried by the upper end of the pantograph lever and pivotally connected to said block, such connection providing a universal movement for the pantograph lever, and means for raising said slides so as to impart a vertical movement to said pantograph lever, the connection of the slides with the nipple spindle extension providing a vertical movement for said nipple spindle and its extension simultaneously with a similar movement of the pantograph lever.

20. The combination in an embroidering machine, of the needle spindle, means for rotating said spindle, means for raising and lowering said spindle as it is rotated, a needle spindle extension surrounding the upper portion of the needle spindle and rotatable therewith, a nipple spindle, a rotatable frame surrounding the lower portion of the nipple spindle and having a channel for the passage of thread, said needle spindle extension also having a channel for the passage of thread, and means whereby the rotation of the needle spindle extension is coincident with the movement of the frame whereby the open ends of said channel will be continuously opposite each other.

21. The combination with an embroidering machine, of a spool for carrying the embroidering thread, a rotating carrier for said spool, means for driving said carrier, and a hinged arm from which said carrier is suspended.

22. The combination with an embroidering machine, of a spool for carrying the embroidering thread, a needle spindle, a channel in said spindle to which said embroidering thread is delivered, and means carried by the head of the embroidering machine for giving said thread a sudden pull at every revolution of the spool.

23. The combination in an embroidering machine, of a spool for carrying the embroidering thread, a rotated carrier for said spool, a needle spindle, a movable guide carried by said spindle, an arm for raising and lowering said spindle and a cam carried by said arm for engaging the movable thread guide whereby said thread may be given a sudden pull at every revolution of the spool carrier.

24. The combination with an embroidering machine, of a standard mounted on the arm of the machine, an arm hinged to said standard, a spool carrier suspended from said arm, a shaft located within the standard and driven from the main driving mechanism, a gear wheel mounted at the upper end of said shaft, and a shaft carried by the arm extending from the standard, with bevel gear wheels carried by said shafts and serving to rotate the spool carrier.

25. The combination in an embroidering machine, of the nipple spindle, a nipple carried thereby, means for delivering the thread to said nipple, a needle spindle carried by the nipple spindle, a needle, means for operating said spindles, a carrier for said thread having a portion of the means for imparting movement to the spindles, and independent means for rotating said carrier whereby the point of delivery of the thread to the needle will always be the same.

26. The combination in an embroidering machine, of the head, a nipple spindle carried thereby, a nipple secured thereto, means for rotating said nipple spindle, means including a needle co-acting with said rotating means for effecting the sewing of an embroidering thread, a nipple spindle extension, a needle spindle extension within the nipple spindle extension and having a thread passage, and a frame carried by said head having a channel for the passage of the embroidering thread, said thread extending thereto from the passage of the needle spindle extension, and being carried with the nipple spindle, maintained out of the way of the operating parts, and delivered uniformly at one point to said nipple, substantially as described.

27. The combination in an embroidering machine, of the nipple spindle, a nipple carried thereby, a needle spindle, a needle spindle extension carrying a needle bar, means for connecting the nipple spindle and the needle spindle whereby they may be rotated simultaneously, a frame surrounding said nipple spindle and carrying part of the means for transmitting movement to the spindle, said frame having a channel for the passage of the embroidering thread whereby said thread may be delivered to the nipple to be sewn by the needle uniformly at one point with respect to the latter during the rotation of said frame, means for driving said frame, and means for imparting vertical movement to said nipple spindle and needle spindle independently of each other.

28. The combination, in an embroidering machine, of the nipple spindle, a nipple carried thereby, means for rotating the nipple spindle and the nipple therewith, a thread carrying spindle surrounding the nipple spindle, and means for driving said thread carrying spindle continuously, the movement of the nipple spindle being intermittent during the continuous rotative movement of the thread carrying spindle.

29. In an embroidering machine, a thread guide, a thread spool from which the thread is delivered to said guide, means for driving said spool, a standard mounted on the frame of the machine and carrying the transmitting means for the thread spool driving mechanism, including a vertical shaft, a worm wheel mounted on said shaft, and a worm meshing therewith carried by the main driving shaft of the machine, said connection providing for the quick stoppage of the embroidering spool when the main driving shaft is stopped.

In testimony whereof, I have signed my name to this specification, in the presence of two subscribing witnesses.

RUDOLF LOEB.

Witnesses:
MURRAY C. BOYER,
JOS. H. KLEIN.